ND
United States Patent [19]

Imai

[11] 4,025,155
[45] May 24, 1977

[54] IMAGE-TRANSMITTING OPTICAL SYSTEM
[75] Inventor: Toshihiro Imai, Hachiouji, Japan
[73] Assignee: Olympus Optical Co., Ltd., Tokyo, Japan
[22] Filed: Dec. 8, 1975
[21] Appl. No.: 638,661
[30] Foreign Application Priority Data
  Dec. 10, 1974 Japan .......................... 49-141191
[52] U.S. Cl. .................................. 350/45; 350/54; 350/204
[51] Int. Cl.² .......................................... G02B 23/00
[58] Field of Search ................ 350/45, 54, 175 FS, 350/204

[56] References Cited
UNITED STATES PATENTS

| | | | |
|---|---|---|---|
| 2,031,792 | 2/1936 | Richter | 350/204 |
| 2,828,669 | 4/1958 | Peckham | 350/204 X |
| 3,257,902 | 6/1966 | Hopkins | 350/19 |
| 3,380,335 | 4/1968 | Clave et al. | 350/204 X |

OTHER PUBLICATIONS

Gardner, *Application of the Algebraic Aberration Equations to Optical Design*, U.S.G.P.O., pp. 160–164, 1927.

*Primary Examiner*—John K. Corbin
*Assistant Examiner*—Matthew W. Koren
*Attorney, Agent, or Firm*—Cushman, Darby & Cushman

[57] ABSTRACT

An image-transmitting optical system comprising field lenses and relay lenses arranged alternately and glass blocks arranged between each of said field lenses and relay lenses, said image-transmitting optical system being arranged to favorably correct aberrations, especially, astigmatism and curvature of field, and to increase intensity of transmitted light.

2 Claims, 9 Drawing Figures

$\Delta m = -0.0078$
$\Delta s = -0.0039$

IMAGE-TRANSMITTING OPTICAL SYSTEM

BACKGROUND OF THE INVENTION

1. Field of the Invention

The present invention relates to an image-transmitting optical system and, more particularly to an image-transmitting optical system for endoscopes (which are not flexible) in which an image of an object is transmitted in turn by using a plural number of relay lenses.

2. Description of the Prior Art

An image focused after passing through a plural number of relay lenses for image transmission as shown in FIG. 1 generally causes considerable negative astigmatism and curvature of field. When one of said plural number of relay lenses is taken up, negative astigmatism caused by that lens is shown in FIG. 2 and curvature of field caused by the same lens is shown in FIG. 3. When, therefore, the number of relay lenses becomes larger, negative astigmatism also becomes larger. This tendency becomes more conspicuous when the focal length of relay lenses is shorter. Curvature of field also increases when the number of relay lenses used for image transmission becomes larger and, consequently, flatness of the image becomes more unfavourable.

Besides, for an image-transmitting optical system, it is desirable that deterioration of the image caused by aberrations is minimized and intensity of transmitted light is maximized.

SUMMARY OF THE INVENTION

It is, therefore, a primary object of the present invention to provide an image-transmitting optical system comprising relay lenses and glass blocks with parallel planar surfaces arranged between respective relay lenses for which aberrations such as astigmatism, curvature of field, etc. are corrected favourably and for which intensity of transmitted light is high.

As shown in FIG. 4, positive astigmatism generally occurs when converging rays pass through a glass plate B with parallel planar surfaces. The positive astigmatism caused at that time is expressed by the following formulas:

$$\Delta m = \frac{d}{n}\left\{1 - \left(\frac{\cos i}{\cos i'}\right)^3\right\}$$

$$\Delta s = \frac{d}{n}\left(1 - \frac{\cos i}{\cos i'}\right)$$

wherein reference symbol $n$ represents refractive index of the glass plate with parallel planar surfaces, reference symbol $d$ represents thickness of the glass plate with parallel planar surfaces, reference symbol $i$ represents the angle of incidence, reference symbol $i'$ represents the angle of refraction, reference symbol $\Delta m$ represents meridional astigmatism and reference symbol $\Delta s$ represents sagittal astigmatism.

By utilizing the above-mentioned positive astigmatism caused by the glass plate or block with parallel planar surfaces arranged in converging rays, it is possible to reduce, when glass blocks with parallel planar surfaces are arranged in front and rear of every relay lens as shown in FIG. 5, the negative astigmatism caused by the relay lenses by means of said positive astigmatism caused by said glass blocks with parallel planar surfaces. FIG. 6 shows the astigmatism of the lens shown in FIG. 5 for which glass blocks with parallel planar surfaces are arranged in front and rear. Compared with the astigmatism shown in FIG. 2, it is evident that the astigmatism shown in FIG. 6 is much improved. Moreover, negative curvature of the field is also caused by glass blocks with parallel planar surfaces. Therefore, it is possible to correct the positive curvature of field caused by the relay lens by means of said glass blocks at the same time. As shown by the above-mentioned formulas, the positive astigmatism caused by the glass block with parallel planar surfaces is in direct proportion to the equivalent optical length $d/n$ of the glass block with parallel planar surfaces. To minimize the negative astigmatism caused by the relay lens, it is therefore preferable to make $d/n$ larger. As, however, $d/n$ is limited by the airspace between the field lens and relay lens, the upper limit of $d/n$ becomes equal to the airspace between the field lens and relay lens. When the image is to be relayed with magnification X1, it is preferable to make $d/n$ as large as possible within the range in which $d/n < 2f_R$ is satisfied (reference symbol $f_R$ represents the focal length of the relay lens). On the other hand, when $d/n$ is small, the correcting effect for the negative astigmatism becomes small. Therefore, it is desirable to make the lower limit of $d/n$ as $f_R < d/n$. Moreover, said glass blocks with parallel planar surfaces also have indispensable effect for increasing the intensity of transmitted light as described later.

Now, intensity of light transmitted by an image-transmitting optical system employing relay lenses is described below referring to FIGS. 7 and 8. When an image is transmitted by using a relay lens shown in FIG. 7, for which focal length is $f_1$ and lens diameter is 2D, the numerical aperture $NA_1$ of the relay lens becomes $NA_1 = D/2f_1$. On the other hand, when glass blocks with parallel planar surfaces for which refractive index is $n$ and thickness is $2f_1$ are arranged in front and rear of a relay lens for which focal length is $f_2$ and lens diameter is 2D as shown in FIG. 8, the numerical aperture $NA_2$ of said relay lens becomes $NA_2 = D/2f_2 = nD/2f_1$. Therefore, the ratio between numerical apertures of the above two cases becomes $(NA_2)^2/(NA_1)^2 = n^2 > 1$. When, therefore, the distance for which the image is relayed by each relay lens is equal throughout the whole optical system, intensity of light transmitted by the relay lens for which glass blocks with parallel planar surfaces are arranged as shown in FIG. 8 becomes $n^2$ times of intensity of light transmitted by the relay lens shown in FIG. 7.

As explained in the above, when glass blocks with parallel planar surfaces are arranged in front and rear of the relay lens, it is possible to reduce the negative astigmatism and positive curvature of field caused by the relay lens and, moreover, to increase the intensity of transmitted light.

The image-transmitting optical system according to the present invention is arranged based on the above-mentioned facts, i.e., arranged by positioning glass blocks with parallel planar surfaces between respective relay lenses and field lenses in order to favourably correct aberrations such as astigmatism, curvature of field, etc. and at the same time to increase the intensity of transmitted light.

DETAILED DESCRIPTION OF THE PREFERRED EMBODIMENT

Figure 1:
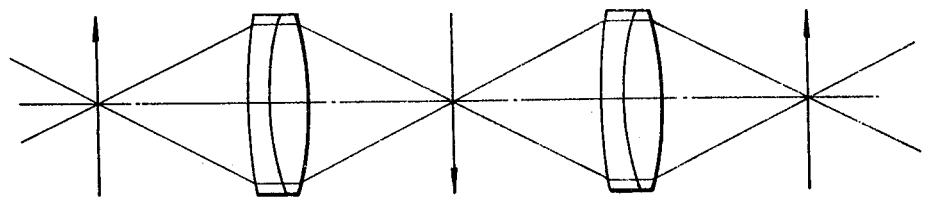
FIG. 1 shows a sectional view illustrating a part of an image-transmitting optical system.
Figure 2:
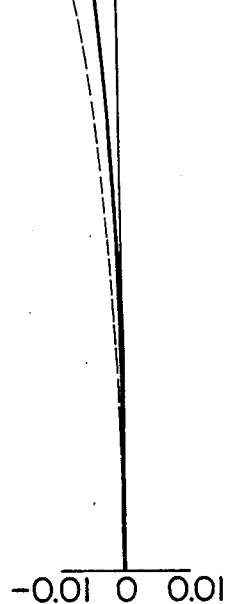
FIG. 2 shows a graph of aberration curves illustrating astigmatism caused by a relay lens.
Figure 3:
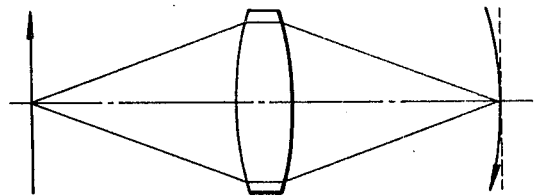
FIG. 3 shows curvature of field caused by the relay lens.
Figure 4:
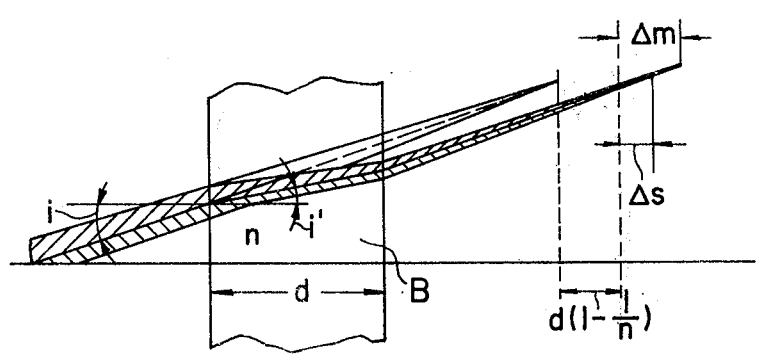
FIG. 4 shows an explanatory figure illustrating astigmatism caused by a glass plate or block with parallel planar surfaces.
Figure 5:
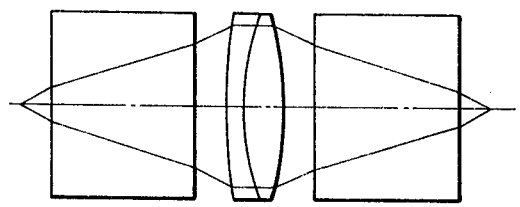
FIG. 5 shows a sectional view illustrating the relay lens and glass blocks with parallel planar surfaces arranged on both sides of the relay lens.
Figure 6:
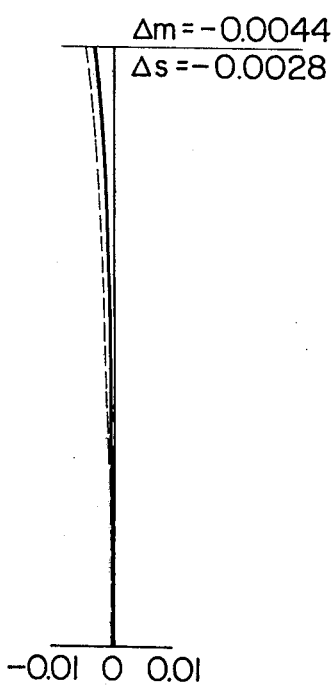
FIG. 6 shows a graph of aberration curves illustrating astigmatism caused by the optical system shown in FIG. 5.
Figure 7:
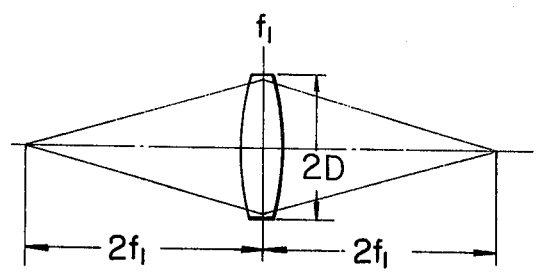
FIGS. 7 and 8 respectively show explanatory figures for explanation of intensity of transmitted light when an image is transmitted by a relay lens.
Figure 8:
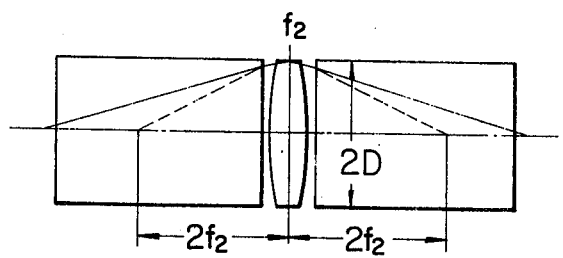

A preferred embodiment of the image-transmitting optical system according to the present invention is as shown below.

Embodiment

| | | |
|---|---|---|
| $r_1 = \infty$ | | |
| $d_1 = 0.5$ | $n_1 = 1.8061$ | $\nu_1 = 40.92$ |
| $r_2 = 0.733$ | | |
| $d_2 = 0.5$ | | |
| $r_3 = \infty$ | | |
| $d_3 = 2.6$ | $n_2 = 1.7859$ | $\nu_2 = 44.10$ |
| $r_4 = \infty$ | | |
| $d_4 = 0.83$ | $n_3 = 1.8061$ | $\nu_3 = 40.92$ |
| $r_5 = -1.842$ | | |
| $d_5 = 0.2$ | | |
| $r_6 = -14.765$ | | |
| $d_6 = 1.45$ | $n_4 = 1.6700$ | $\nu_4 = 57.33$ |
| $r_7 = -1.018$ | | |
| $d_7 = 0.36$ | $n_5 = 1.7847$ | $\nu_5 = 25.71$ |
| $r_8 = -2.831$ | | |
| $d_8 = 1.16$ | | |
| $r_9 = 3.856$ | | |
| $d_9 = 6.0$ | $n_6 = 1.5163$ | $\nu_6 = 64.15$ |
| $r_{10} = -3.856$ | | |
| $d_{10} = 1.3$ | | |
| $r_{11} = \infty$ | | |
| $d_{11} = 24.0$ | $n_7 = 1.5163$ | $\nu_7 = 64.15$ |
| $r_{12} = \infty$ | | |
| $d_{12} = 1.0$ | | |
| $r_{13} = 8.084$ | | |
| $d_{13} = 1.0$ | $n_8 = 1.6989$ | $\nu_8 = 30.12$ |
| $r_{14} = 3.399$ | | |
| $d_{14} = 3.0$ | $n_9 = 1.5890$ | $\nu_9 = 48.60$ |
| $r_{15} = -13.780$ | | |
| $d_{15} = 1.0$ | | |
| $r_{16} = \infty$ | | |
| $d_{16} = 24.0$ | $n_{10} = 1.5163$ | $\nu_{10} = 64.15$ |
| $r_{17} = \infty$ | | |
| $d_{17} = 1.05$ | | |
| $r_{18} = 10.105$ | | |
| $d_{18} = 6.0$ | $n_{11} = 1.5163$ | $\nu_{11} = 64.15$ |
| $r_{19} = -10.105$ | | |
| $d_{19} = 1.4$ | | |
| $r_{20} = \infty$ | | |
| $d_{20} = 24.0$ | $n_{12} = 1.5163$ | $\nu_{12} = 64.15$ |
| $r_{21} = \infty$ | | |
| $d_{21} = 1.39$ | | |
| $r_{22} = 8.084$ | | |
| $d_{22} = 1.0$ | $n_{13} = 1.6989$ | $\nu_{13} = 30.12$ |
| $r_{23} = 3.399$ | | |
| $d_{23} = 3.0$ | $n_{14} = 1.5890$ | $\nu_{14} = 48.60$ |
| $r_{24} = -13.780$ | | |
| $d_{24} = 1.0$ | | |
| $r_{25} = \infty$ | | |
| $d_{25} = 24.0$ | $n_{15} = 1.5163$ | $\nu_{15} = 64.15$ |
| $r_{26} = \infty$ | | |
| $d_{26} = 1.05$ | | |
| $r_{27} = 10.105$ | | |
| $d_{27} = 6.0$ | $n_{16} = 1.5163$ | $\nu_{16} = 64.15$ |
| $r_{28} = 10.105$ | | |
| $d_{28} = 1.4$ | | |
| $r_{29} = \infty$ | | |
| $d_{29} = 24.0$ | $n_{17} = 1.5163$ | $\nu_{17} = 64.15$ |
| $r_{30} = \infty$ | | |
| $d_{30} = 1.39$ | | |
| $r_{31} = 8.084$ | | |
| $d_{31} = 1.0$ | $n_{18} = 1.6989$ | $\nu_{18} = 30.12$ |
| $r = 3.399$ | | |
| $d_{32} = 3.0$ | $n_{19} = 1.5890$ | $\nu_{19} = 48.60$ |
| $r_{33} = -13.780$ | | |
| $d_{33} = 1.0$ | | |
| $r_{34} = \infty$ | | |
| $d_{34} = 24.0$ | $n_{20} = 1.5163$ | $\nu_{20} = 64.15$ |
| $r_{35} = \infty$ | | |
| $d_{35} = 1.05$ | | |
| $r_{36} = 10.105$ | | |
| $d_{36} = 6.0$ | $n_{21} = 1.5163$ | $\nu_{21} = 64.15$ |
| $r_{37} = -10.105$ | | |
| $d_{37} = 1.4$ | | |
| $r_{38} = \infty$ | | |
| $d_{38} = 24.0$ | $n_{22} = 1.5163$ | $\nu_{22} = 64.15$ |
| $r_{39} = \infty$ | | |
| $d_{39} = 1.39$ | | |
| $r_{40} = 8.084$ | | |
| $d_{40} = 1.0$ | $n_{23} = 1.6989$ | $\nu_{23} = 30.12$ |
| $r_{41} = 3.399$ | | |
| $d_{41} = 3.0$ | $n_{24} = 1.5890$ | $\nu_{24} = 48.60$ |
| $r_{42} = -13.780$ | | |
| $d_{42} = 1.0$ | | |
| $r_{43} = \infty$ | | |
| $d_{43} = 24.0$ | $n_{25} = 1.5163$ | $\nu_{25} = 64.15$ |
| $r_{44} = \infty$ | | |
| $d_{44} = 1.05$ | | |
| $r_{45} = 10.105$ | | |
| $d_{45} = 6.0$ | $n_{26} = 1.5163$ | $\nu_{26} = 64.15$ |
| $r_{46} = -10.105$ | | |
| $d_{46} = 1.4$ | | |
| $r_{47} = \infty$ | | |
| $d_{47} = 24.0$ | $n_{27} = 1.5163$ | $\nu_{27} = 64.15$ |
| $r_{48} = \infty$ | | |
| $d_{48} = 1.39$ | | |
| $r_{49} = 8.084$ | | |
| $d_{49} = 1.0$ | $n_{28} = 1.6989$ | $\nu_{28} = 30.12$ |
| $r_{50} = 3.399$ | | |
| $d_{50} = 3.0$ | $n_{29} = 1.5890$ | $\nu_{29} = 48.60$ |
| $r_{51} = -13.780$ | | |
| $d_{51} = 1.0$ | | |
| $r_{52} = \infty$ | | |
| $d_{52} = 16.18$ | $n_{30} = 1.5163$ | $\nu_{30} = 64.15$ |
| $r_{53} = \infty$ | | |
| $d_{53} = 3.58$ | | |
| $r_{54} = -67.722$ | | |
| $d_{54} = 1.0$ | $n_{31} = 1.51633$ | $\nu_{31} = 64.1$ |
| $r_{55} = 12.798$ | | |
| $d_{55} = 15.33$ | | |
| $r_{56} = 8.701$ | | |
| $d_{56} = 0.8$ | $n_{32} = 1.78472$ | $\nu_{32} = 25.7$ |
| $r_{57} = 4.339$ | | |
| $d_{57} = 2.6$ | $n_{33} = 1.58904$ | $\nu_{33} = 53.3$ |
| $r_{58} = -12.162$ | | |
| $f = 1.155$ | $f_e = 8.918$ | |

In the above, reference symbols $r_1$ through $r_{58}$ respectively represent radii of curvature of respective lenses including glass blocks with parallel planar surfaces, reference symbols $d_1$ through $d_{57}$ respectively represent thicknesses of respective lenses and glass blocks and airspaces between respective lenses and glass blocks with parallel planar surfaces, reference symbols $n_1$ through $n_{33}$ respectively represent refractive indices of respective lenses and glass blocks with parallel planar surfaces, reference symbols $\nu_1$ through $\nu_{33}$ respectively represent Abbe's numbers of respective lenses and glass blocks with parallel planar surfaces, reference symbol $f$ represents the focal length of the image transmitting optical system inclusive of the objective, and reference symbol $f_e$ represents the focal length of the eyepiece.

Figure 9:
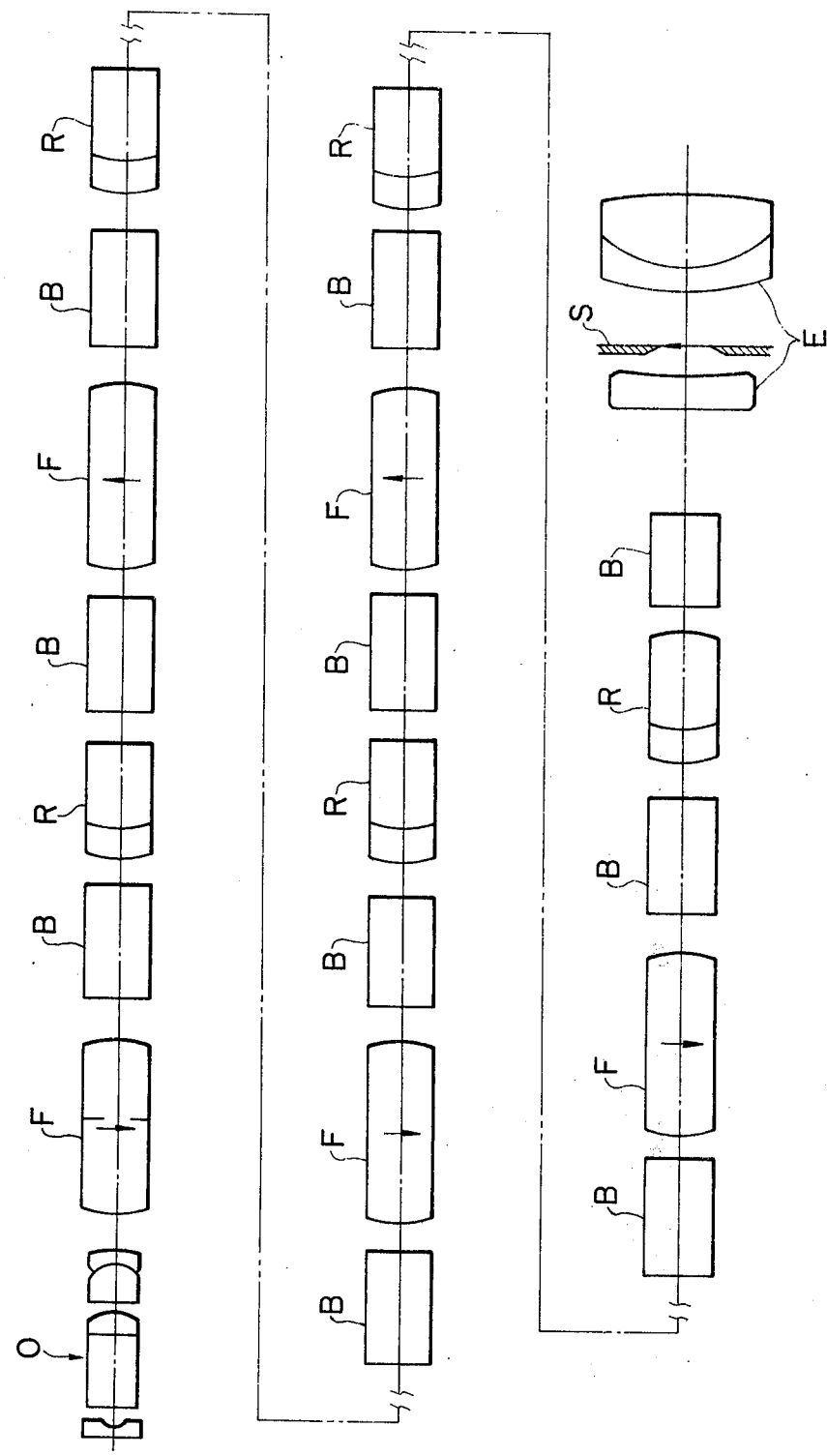
FIG. 9 shows a sectional view of an embodiment of the present invention.

The above embodiment has configuration as shown in FIG. 9 in which reference symbol O represents the objective, reference symbol F represents field lenses, reference symbol R represents relay lenses, reference symbol B represents glass blocks with parallel planar surfaces, reference symbol S represents the stop and reference symbol E represents the eyepiece. In said optical system, an image is focused by the objective O into the field lens F which is closest to the objective and is then transmitted being focused in turn by respective relay lenses R. In front and rear of respective relay lenses R, glass blocks with parallel planar surfaces B are arranged between each relay lens R and field lens F.

For the image-transmitting optical system according to the above embodiment, aberrations especially astigmatism and curvature of field are extremely small and, moreover, it is possible to obtain a clear image with high intensity of light.

I claim:

1. An image-transmitting optical system comprising field lenses and relay lenses arranged alternately and glass blocks with parallel planar surfaces, each of said relay lenses being a positive cemented doublet lens consisting of a concave lens and convex lens cemented to each other, each of said glass blocks with parallel planar surfaces being arranged between each field lens and relay lens, equivalent optical length $d/n$ of each of said glass blocks with parallel planar surfaces satisfying the following condition:

$$f_R < d/n < 2f_R$$

wherein reference symbol $d$ represents thickness of each glass block with parallel planar surfaces, reference symbol $n$ represents refractive index of each glass block with parallel planar surfaces, and reference symbol $f_R$ represents focal length of each relay lens.

2. An image-transmitting optical system comprising an objective, field lenses and relay lenses arranged alternately, glass blocks with parallel planar surfaces, and an eyepiece, said objective comprising a concave lens and two cemented doublet lenses, each of said relay lenses being a positive cemented doublet lens consisting of a concave lens and convex lens cemented to each other, each of said glass blocks with parallel planar surfaces being arranged between each field lens and relay lens, said eyepiece comprising a concave lens and a positive cemented doublet lens, said image-transmitting optical system having numerical values as given below:

| | | | |
|---|---|---|---|
| $r_1 = \infty$ | | | |
| | $d_1 = 0.5$ | $n_1 = 1.8061$ | $\nu_1 = 40.92$ |
| $r_2 = 0.733$ | | | |
| | $d_2 = 0.5$ | | |
| $r_3 = \infty$ | | | |
| | $d_3 = 2.6$ | $n_2 = 1.7859$ | $\nu_2 = 44.10$ |
| $r_4 = \infty$ | | | |
| | $d_4 = 0.83$ | $n_3 = 1.8061$ | $\nu_3 = 40.92$ |
| $r_5 = -1.842$ | | | |
| | $d_5 = 0.2$ | | |
| $r_6 = -14.765$ | | | |
| | $d_6 = 1.45$ | $n_4 = 1.6700$ | $\nu_4 = 57.33$ |
| $r_7 = 1.018$ | | | |
| | $d_7 = 0.36$ | $n_5 = 1.7847$ | $\nu_5 = 25.71$ |
| $r_8 = -2.831$ | | | |
| | $d_8 = 1.16$ | | |
| $r_9 = 3.856$ | | | |
| | $d_9 = 6.0$ | $n_6 = 1.5163$ | $\nu_6 = 64.15$ |
| $r_{10} = -3.856$ | | | |
| | $d_{10} = 1.3$ | | |
| $r_{11} = \infty$ | | | |
| | $d_{11} = 24.0$ | $n_7 = 1.5163$ | $\nu_7 = 64.15$ |
| $r_{12} = \infty$ | | | |
| | $d_{12} = 1.0$ | | |
| $n_{13} = 8.084$ | | | |
| | $d_{13} = 1.0$ | $n_8 = 1.6989$ | $\nu_8 = 30.12$ |
| $r_{14} = 3.399$ | | | |
| | $d_{14} = 3.0$ | $n_9 = 1.5890$ | $\nu_9 = 48.60$ |

-continued

| | | | |
|---|---|---|---|
| $r_{15} = -13.780$ | | | |
| | $d_{15} = 1.0$ | | |
| $r_{16} = \infty$ | | | |
| | $d_{16} = 24.0$ | $n_{10} = 1.5163$ | $\nu_{10} = 64.15$ |
| $r_{17} = \infty$ | | | |
| | $d_{17} = 1.05$ | | |
| $r_{18} = 10.105$ | | | |
| | $d_{18} = 6.0$ | $n_{11} = 1.5163$ | $\nu_{11} = 64.15$ |
| $r_{19} = -10.105$ | | | |
| | $d_{19} = 1.4$ | | |
| $r_{20} = \infty$ | | | |
| | $d_{20} = 24.0$ | $n_{12} = 1.5163$ | $\nu_{12} = 64.15$ |
| $r_{21} = \infty$ | | | |
| | $d_{21} = 1.39$ | | |
| $r_{22} = 8.084$ | | | |
| | $d_{22} = 1.0$ | $n_{13} = 1.6989$ | $\nu_{13} = 30.12$ |
| $r_{23} = 3.399$ | | | |
| | $d_{23} = 3.0$ | $n_{14} = 1.5890$ | $\nu_{14} = 48.60$ |
| $r_{24} = -13.780$ | | | |
| | $d_{24} = 1.0$ | | |
| $r_{25} = \infty$ | | | |
| | $d_{25} = 24.0$ | $n_{15} = 1.5163$ | $\nu_{15} = 64.15$ |
| $r_{26} = \infty$ | | | |
| | $d_{26} = 1.05$ | | |
| $r_{27} = 10.105$ | | | |
| | $d_{27} = 6.0$ | $n_{16} = 1.5163$ | $\nu_{16} = 64.15$ |
| $r_{28} = -10.105$ | | | |
| | $d_{28} = 1.4$ | | |
| $r_{29} = \infty$ | | | |
| | $d_{29} = 24.0$ | $n_{17} = 1.5163$ | $\nu_{17} = 64.15$ |
| $r_{30} = \infty$ | | | |
| | $d_{30} = 1.39$ | | |
| $r_{31} = 8.084$ | | | |
| | $d_{31} = 1.0$ | $n_{18} = 1.6989$ | $\nu_{18} = 30.12$ |
| $r_{32} = 3.399$ | | | |
| | $d_{32} = 3.0$ | $n_{19} = 1.5890$ | $\nu_{19} = 48.60$ |
| $r_{33} = -13.780$ | | | |
| | $d_{33} = 1.0$ | | |
| $r_{34} = \infty$ | | | |
| | $d_{34} = 24.0$ | $n_{20} = 1.5163$ | $\nu_{20} = 64.15$ |
| $r_{35} = \infty$ | | | |
| | $D_{35} = 1.05$ | | |
| $R_{36} = 10.105$ | | | |
| | $d_{36} = 6.0$ | $n_{21} = 1.5163$ | $\nu_{21} = 64.15$ |
| $r_{37} = -10.105$ | | | |
| | $d_{37} = 1.4$ | | |
| $r_{38} = \infty$ | | | |
| | $d_{38} = 24.0$ | $n_{22} = 1.5163$ | $\nu_{22} = 64.15$ |
| $r_{39} = \infty$ | | | |
| | $d_{39} = 1.39$ | | |
| $r_{40} = 8.084$ | | | |
| | $d_{40} = 1.0$ | $n_{23} = 1.6989$ | $\nu_{23} = 30.12$ |
| $r_{41} = 3.399$ | | | |
| | $d_{41} = 3.0$ | $n_{24} = 1.5890$ | $\nu_{24} = 48.60$ |
| $r_{42} = -13.780$ | | | |
| | $d_{42} = 1.0$ | | |
| $r_{43} = \infty$ | | | |
| | $d_{43} = 24.0$ | $n_{25} = 1.5163$ | $\nu_{25} = 64.15$ |
| $r_{44} = \infty$ | | | |
| | $d_{44} = 1.05$ | | |
| $r_{45} = 10.105$ | | | |
| | $d_{45} = 6.0$ | $n_{26} = 1.5163$ | $\nu_{26} = 64.15$ |
| $r_{46} = -10.105$ | | | |
| | $d_{46} = 1.4$ | | |
| $r_{47} = \infty$ | | | |
| | $d_{47} = 24.0$ | $n_{27} = 1.5163$ | $\nu_{27} = 64.15$ |
| $r_{48} = \infty$ | | | |
| | $d_{48} = 1.39$ | | |
| $r_{49} = 8.084$ | | | |
| | $d_{49} = 1.0$ | $n_{28} = 1.6989$ | $\nu_{28} = 30.12$ |
| $r_{50} = 3.399$ | | | |
| | $d_{50} = 3.0$ | $n_{29} = 1.5890$ | $\nu_{29} = 48.60$ |
| $r_{51} = -13.780$ | | | |
| | $d_{51} = 1.0$ | | |
| $r_{52} = \infty$ | | | |
| | $d_{52} = 16.18$ | $n_{30} = 1.5163$ | $\nu_{30} = 64.15$ |
| $r_{53} = \infty$ | | | |
| | $d_{53} = 3.58$ | | |
| $r_{54} = -67.722$ | | | |
| | $d_{54} = 1.0$ | $n_{31} = 1.51633$ | $\nu_{31} = 64.1$ |
| $r_{55} = 12.798$ | | | |
| | $d_{55} = 15.33$ | | |
| $r_{56} = 8.701$ | | | |
| | $d_{56} = 0.8$ | $n_{32} = 1.78472$ | $\nu_{32} = 25.7$ |
| $r_{57} = 4.339$ | | | |
| | $d_{57} = 2.6$ | $n_{33} = 1.58904$ | $\nu_{33} = 53.3$ |
| $r_{58} = -12.162$ | | | |
| | $f = 1.155$ | $f_e = 8.918$ | | wherein, reference symbols $r_1$ through $r_{58}$ respectively represent represent radii of curvature of respective lenses including glass blocks with parallel planar surfaces, reference symbols $d_1$ through $d_{57}$ respectively represent thicknesses of respective lenses and glass blocks and airspaces between respective lenses and glass blocks with parallel planar surfaces, reference symbols $n_1$ through $n_{33}$ respectively represent refractive indices of respective lenses and glass blocks with parallel planar surfaces, reference symbols $\nu_1$ through $\nu_{33}$ respectively represent Abbe's numbers of respective lenses and glass blocks with parallel planar surfaces, reference symbol $f$ represents the focal length of the image transmitting optical system inclusive of the objective, and reference symbol $f_e$ represents the focal length of the eyepiece.

* * * * *